June 4, 1963 P. W. DULLABAUN ETAL 3,092,397
VEHICLE LEVELIZING MECHANISM
Filed Sept. 11, 1959 7 Sheets-Sheet 1

INVENTORS:
PAUL W. DULLABAUN.
RICHARD E. HANSLIP.
BY
Hugh A Kirk
ATTY.

United States Patent Office 3,092,397
Patented June 4, 1963

3,092,397
VEHICLE LEVELIZING MECHANISM
Paul W. Dullabaun and Richard E. Hanslip, Toledo, Ohio, assignors to Mather Spring Co., Toledo, Ohio, a corporation of Ohio
Filed Sept. 11, 1959, Ser. No. 839,395
16 Claims. (Cl. 280—124)

This invention relates to vehicle suspensions. More particularly, it deals with a leaf spring suspension for a vehicle and means for varying the effective length of at least one of the springs of such a suspension in accordance with the load on the vehicle in order to improve the riding characteristics of the vehicle.

It is well recognized in the design of the suspension of modern automotive type vehicles, that a fixed spring suspension is a compromise based on average expected load conditions. In vehicles with such suspensions, when heavier than average loads are carried a lower ride position results, and when the load is light a higher ride position results. These differences in ride position of a suspension affect the overall appearance of the vehicle and to a large extent its handling characteristics.

In addition to the factors affecting the ride position of the vehicle, there are those factors which affect the ride characteristics, mainly the vehicle's natural frequency of vibration. It is considered highly desirable to maintain this frequency at as constant and optimum a value as possible, since the "feel of the ride" of a vehicle depends on these factors. It has been determined that the optimum value for the natural frequency of suspension of a passenger automobile is in the range of from 60 to 65 cycles per minute. The natural frequency of any suspension may be expressed by the following general formula:

$$F_n = \frac{1}{2}\sqrt{\frac{k}{m}}$$

wherein $k$ is the spring constant and $m$ is the mass or load applied to the spring. Thus, according to this formula the natural frequency of the suspension $F_n$ is inversely proportioned to the square root of the mass including the load and directly proportional to the square root of the spring constant, and a change in either factor alone will change the frequency rate of the suspension. Therefore, in order to maintain a substantially constant frequency rate for variable load conditions, the constant $k$ of the spring also must be varied.

Accordingly it is an object of this invention to produce an efficient, effective, simple, economic, powerful, easy, quiet and sensitive leaf spring suspension control mechanism for vehicles which maintains the natural frequency of the suspension of the vehicle substantially constant so as to improve the riding characteristics of the vehicle.

Another object of this invention is to produce a control system for such a suspension mechanism, which automatically responds to the changes in static load on a vehicle, to maintain the chassis in the same position from the axle of the vehicle to improve the handling and appearance of the vehicle.

Another object is to produce such a suspension mechanism for simultaneously changing both the length of and the stress applied to a leaf spring of such a suspension.

Another object is to produce such a suspension mechanism which will maintain the chassis of the vehicle substantially level regardless of where or how much of a load is placed thereon.

Another object is to provide such a mechanism which will not need to operate between changes in static load, nor will creep out of adjustment when the vehicle rides over a bump in the road.

Another object is to provide such a suspension system which holds the chassis of the vehicle transversely in position with respect to its axles without guides, as are required in air-cushion suspension systems, and provides all the suspension advantages of a leaf spring suspension together with the riding control characteristics of an adjustable air-cushion suspension.

Generally speaking, this invention comprises a levelizing device for a vehicle having a leaf spring suspension, in which at least one end of a load supporting spring or springs of this suspension is engaged by a movable shackle assembly, which assembly is moved to increase or decrease the effective length and may also simultaneously decrease and increase the stress on the spring, respectively, in accordance with variations in the static load on the vehicle. Such a movable shackle assembly may comprise a pair of rollers which engage opposite sides of the top, upper, or outer extending leaves at at least one end of a leaf spring. These rollers may be mounted in a carriage guided in a path either longitudinal with the leaf of said spring, or at an angle thereto other than horizontal with the chassis and road (preferably at about an angle of 30° to the road), to vary both the length of and the stress on the leaf spring. The guided path may be defined by the motion of a lever or by a track with guides on the carriage cooperating therewith. This movable shackle assembly may be driven in either direction by a reversible electric motor through a gear reduction mechanism or by a reversible hydraulic motor. This drive mechanism may be pivotally mounted to follow the movement of the carriage along its guide path or may be rigidly mounted and connected to the carriage directly or by a link or links. This shackle assembly may be attached to the chassis and enclosed in a housing to prevent dirt from the road hindering its normal smooth and easy operation. In this housing there may be provided the guideway for a carriage which mounts the rollers that shackle opposite faces of the leaf spring.

The motor for this drive may be automatically and/or manually controlled through sensing switches, which gauge a predetermined distance between the axle and the frame or chassis of the vehicle for the optimum setting of the spring suspension. In order to prevent the mechanism from hunting every time a vehicle goes over a bump and the relative distance between the axle and the chassis is varied, the electrical control system for operating the mechanism may be energized only when the vehicle is stopped, such as by a switch on its doors and/or trunk lid, which closes when they are opened. A bypass or holding relay also may be provided so that the mechanism will have sufficient time to adjust itself even if the door or trunk lid is immediately closed after it is opened. The time required for the operation of the leveling mechanism, however, is sufficiently short so that it is practically impossible for a vehicle to be started and in motion after the door thereto is closed, before the levelizing device has automatically adjusted the level of weight of the vehicle to its optimum position for constant height and frequency rate. If desired, manual bypass switches may be provided in the control circuit by which the height of the vehicle may be changed at the will of the operator, by bypassing leveling sensing switches in the circuit. Furthermore, the control of the circuit may also be tied into the ignition switch of the vehicle, so that if the chassis of the vehicle is to be raised, such as to change a tire, the mechanism will be cut out and not operate to counteract the change in load produced by jacking up any part of the chassis.

The above mentioned and other objects and features of this invention and the manner of attaining them will become more apparent and the invention itself will be best understood by reference to the following description of embodiments of this invention taken in conjunction with the accompanying drawings, wherein.

In order to clarify the following detailed description of different embodiments and features of this invention, it will be divided into sections according to the following outline:

I. Chassis and Leaf Spring Suspension (FIGS. 1, 2, 3, 11 and 12)
II. Levelizing Mechanisms
    (A) Housing for Said Mechanisms (FIGS. 1 through 6, 11, 12, 13, 14 and 15)
    (B) Actuators (FIGS. 2 through 15)
        (1) Oscillating drive oscillating carriage type (FIG. 4).
        (2) Oscillating drive reciprocating carriage type
            (a) Separate motor drive (FIGS. 5 through 10)
            (b) Single motor drive (FIGS. 11 and 12)
            (c) Hydraulic motor drive (FIG. 13)
        (3) Fixed drive reciprocating carriage type (FIGS. 14, 15 and 16)
    (C) Automatic Sensing Switch (FIGS. 17 through 20)
    (D) Electric Control Circuits
        (1) Hydraulic-Electric System (FIG. 21)
        (2) Single Motor Electric System (FIGS. 22 and 23)
        (3) Plural Motor Electric System (FIG. 24)
III. Modifications and Conclusions

I. CHASSIS AND LEAF SPRING SUSPENSION

Referring to FIGS. 1, 2, 3 and 11 there is shown the rear end of an automobile chassis 30 which may comprise right and left longitudinal side beam members 31 and 32, across which may be mounted horizontal beam members 33 and 34, upon which the load on the vehicle is generally placed. The rear of the longitudinal beam members 31 and 32 may be each provided with a pair of extensions 35, 36, 37, 38, respectively, across the rear ends of which extensions may be attached an additional cross member 39 at the rear end of the vehicle chassis frame assembly.

Below the chassis or frame 30 there is shown a transverse horizontal axle housing 40 on the outer ends of which may be mounted right and left rear wheels 41 and 42 of the vehicle.

Between the axle 40 and the vehicle frame 30 there is shown, in the embodiments herein, a pair of longitudinal multi-leaf suspension springs 50 which may have their center anchored to the rear axle housing 40 by means of seats 51 and plates 52 on opposite sides of the leaves of the springs, which seats, plates and spring leaves may be clamped together to the axle housing 40 by pairs of U-bolts 53 extending through the seats 51 and plates 52.

Figure 1:
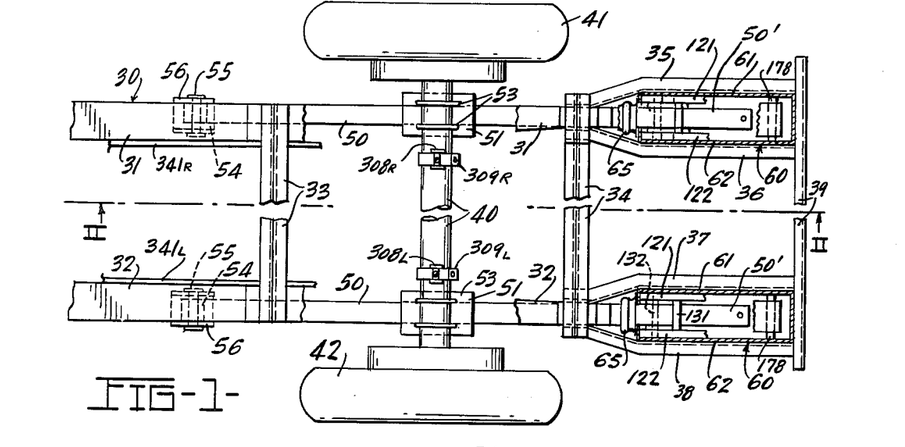
FIG. 1 is a plan view of the rear portion of a vehicle frame and its suspension, with parts broken away, provided with a pair of separate levelizing devices mounted at the rear end of each leaf spring of the suspension.
Figure 2:
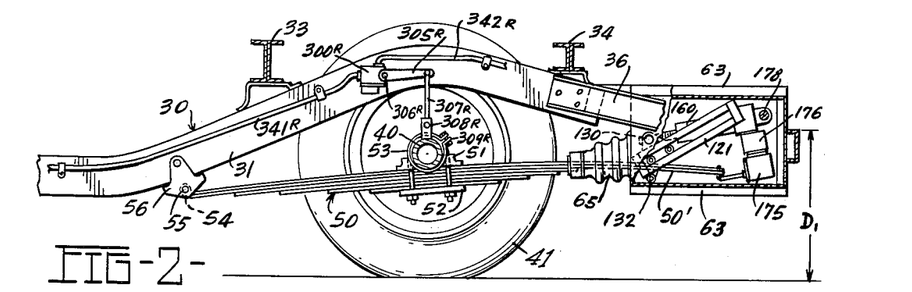
FIG. 2 is a sectional side view taken along line II—II of FIG. 1 showing the levelizing mechanism in a position for supporting a relatively heavy static load.
Figure 3:
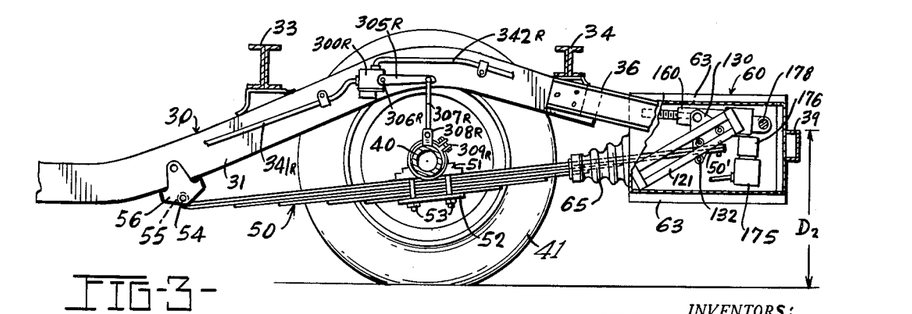
FIG. 3 is a sectional side view similar to FIG. 2 showing the levelizing mechanism in a position for supporting a relatively light static load.
Figures 4, 5, 6:
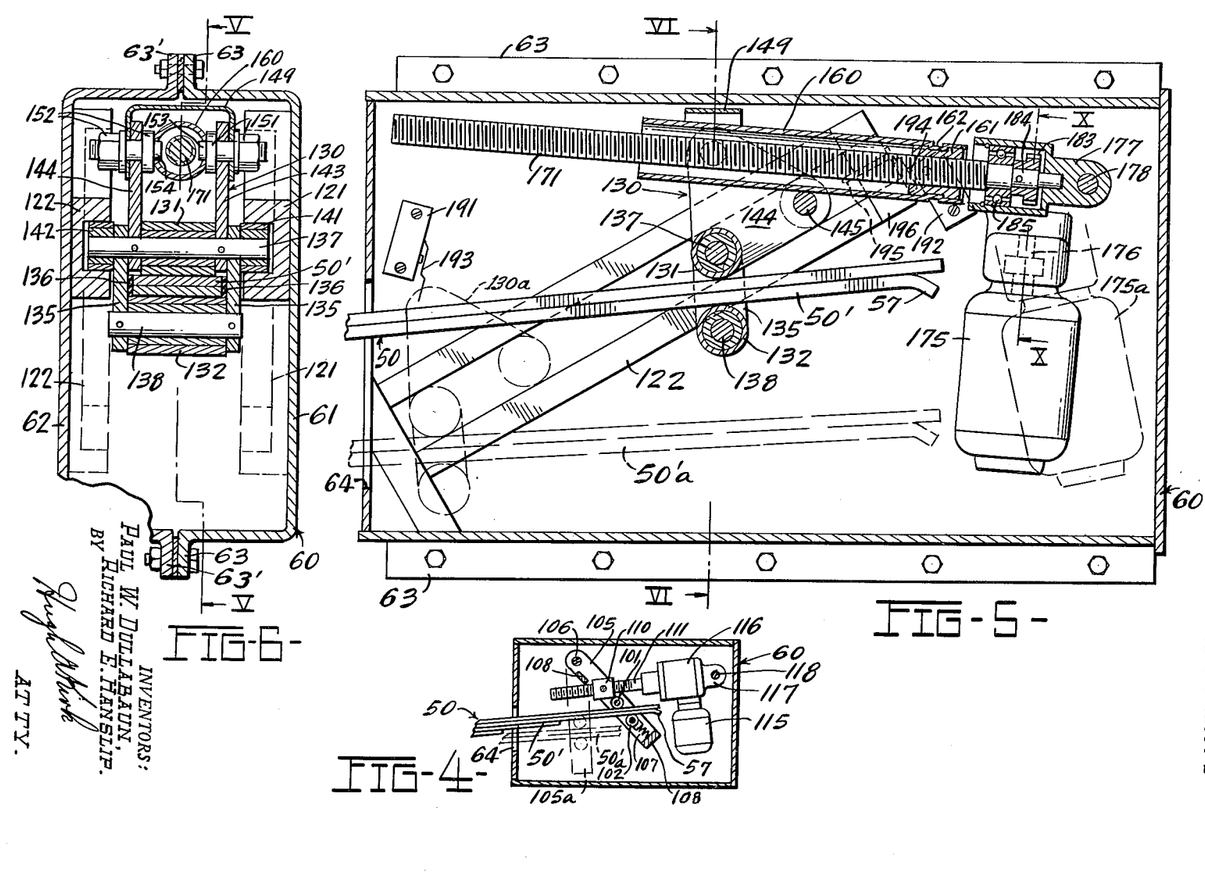
FIG. 4 is a vertical section of one embodiment of a levelizing mechanism which may be employed in the housings therefor shown in FIGS. 1, 2 and 3.
FIG. 5 is an enlarged vertical section of another embodiment of a levelizing mechanism according to this invention, which may be employed in the housings shown in FIGS. 1, 2 and 3, or a section taken along line V—V of FIG. 6, with an alternate position of the mechanism being shown in dashed lines.
FIG. 6 is a vertical sectional view taken along line VI—VI of FIG. 5, the tracks of the mechanism being shown in dashed lines.

The forward ends of the leaf spring assemblies 50 may have eyes 54 which may be formed from the upper or longest one or two leaves of the leaf spring assembly 50, which eyes may be fastened by bolts 55 to shackle brackets 56 mounted on frame members 31 and 32 of the chassis 30 (see FIGS. 1, 2 and 3).

Figure 13:
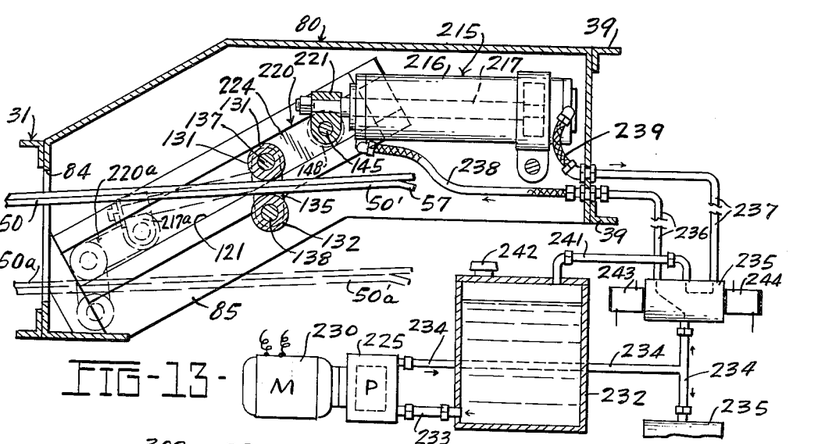
FIG. 13 is an enlarged vertical section, similar to FIG. 5, of still another embodiment of a leveling device according to this invention, showing a hydraulic driving motor and fluid operating system, and a different type housing, with an alternate position of the mechanism being shown in dashed lines.
Figures 14, 15, 16:
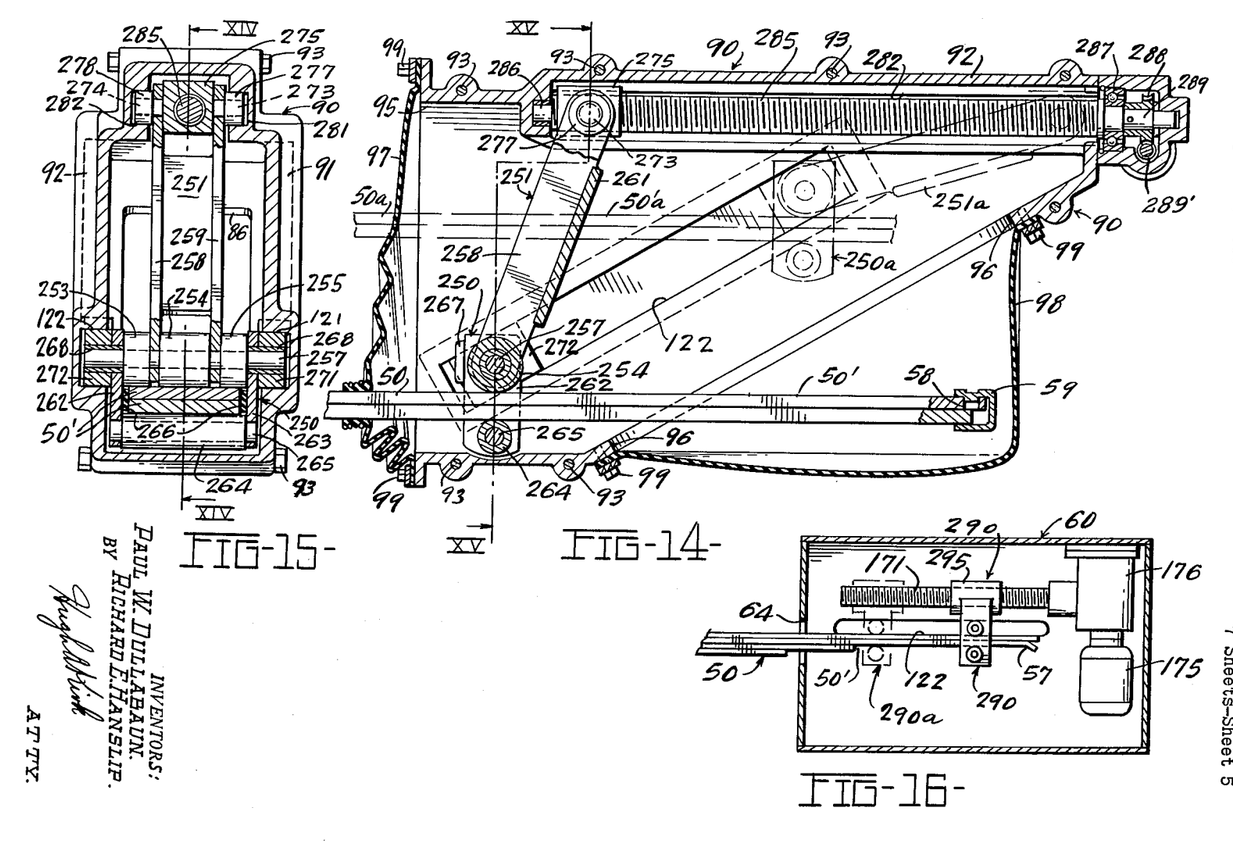
FIG. 14 is an enlarged vertical section, also similar to FIG. 5, of still another embodiment of the leveling device of this invention, showing a fixed drive connected by a link to the movable shackle carriage and still another type of housing therefor, with an alternate position being shown in dashed lines.
FIG. 15 is a vertical section taken along line XV—XV of FIG. 14.
FIG. 16 is a vertical section similar to FIG. 4 of still another embodiment of a leveling mechanism showing another fixed drive directly connected to a movable shackle and movable substantially parallel with the end section of a leaf spring.

The other or rear end 50' of each leaf spring assembly 50, which end may comprise the upper or longest two leaves of the spring assembly 50, are preferably formed flat or straight without any eye 54 therein, so that the movable shackle assembly of this invention may freely move therealong, as will be described later. The tip ends of this spring portion 50', however, may be provided with a stop to limit the movement of the movable shackle, such as by forming a slight bend 57 in one of the leaves as shown in FIGS. 4, 13 and 16, or one of the leaves may be provided with a detent or aperture 58 into which may be pressed a headed pin, stud or rivet, or, as shown in FIG. 14, a clip 59 formed around said outer tip ends.

II. LEVELIZING MECHANISMS

A. Housings for Said Mechanisms

Referring now to FIGS. 1 through 6, and 11 through 16, there are shown several different embodiments of housings for the mechanisms of this invention, into which the ends 50' of the leaf spring suspension assemblies 50 may extend.

Referring to the housings of the embodiments shown in FIGS. 1 through 6, there may be provided a rectangular shaped metal box 60, which may be formed of two equal cooperating shells 61 and 62 (see FIG. 6) with side flanges 63 and 63', respectively, which flanges may be welded, bolted or screwed together to form an enclosure, which may be welded or otherwise anchored to the frame or chassis 30 between the two forked extensions 35, 36 and 37, 38 on the rear ends of the frame members 31 and 32 as shown in FIG. 1 with the rear sides of these housings 60 abutting against the rear transverse member 39.

The forward end of each of the housings 60 is provided with an aperture 64 (see FIGS. 5 and 16) through which the portions 50' of the leaf spring extend and are free to move up and down between the two positions shown in FIGS. 2 and 3, or the full and dashed line positions 50' and 50'a shown in FIG. 5. In order to prevent dirt and dust from contaminating the mechanism, it is desirable that a flexible cover or plate or rubber boot 65 be fastened around the opening 64 and extend outward and around the leaves of the spring 50 as shown in FIGS. 2 and 3. Thus the mechanism is substantially sealed from the weather, moisture, dirt and dust, and also is free to operate as the spring 50 is flexed.

Figure 11:
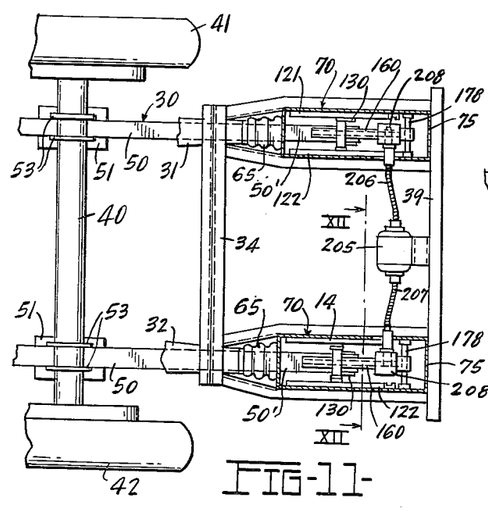
FIG. 11 is a plan view similar to that shown in FIG. 1 of another embodiment of this invention in which a single motor is employed for driving both leveling devices shown.
Figure 12:
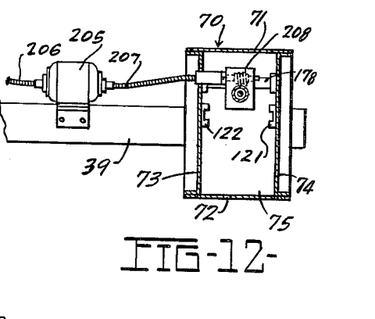
FIG. 12 is a vertical section taken along line XII—XII of FIG. 11 showing flexible drive connections from the motor and one leveling device.

In FIGS. 11 and 12 there is shown another embodiment of a housing 70, in which the sides thereof are sufficiently rigid to form the extensions onto the ends of the frame members 31 and 32 of the chassis 30, as well as to support the rear cross member 39. Similarly, these housings 70 have apertured forward ends through which the rear ends 50' of the leaf springs 50 extend, and over and around which may be provided boots 65. As shown in FIG. 12 these housings 70 may be formed of upper and lower plates 71 and 72, flanged side plates 73 and 74 which flanges may be welded, riveted or bolted to the edges of the end plates, and a back plate 75.

In FIG. 13 there is shown still another embodiment of housing 80 which may comprise only a top shell portion with a forward opening 84 and an open bottom 85 through both of which openings the end portion 50' of the leaf spring 50 may be free to extend and move. Similar to the embodiment shown in FIGS. 11 and 12, this housing 80 may be welded integral between the ends of the chassis frame members 31 and 32 and have at its outer end welded or otherwise attached to the cross member 39.

In FIGS. 14 and 15, a cast metal housing 90 is shown, comprising a pair of complementary dish-shaped members 91 and 92 (see FIG. 15) which may be bolted together by means of bolts 93 at spaced intervals around its periphery. This particular housing 90 may be lightened in weight by being cast of a lighter metal such as aluminum instead of steel. This housing is shown herein to be provided with an open front side 95 as well as an aperture 96 in its diagonal rear side, through both of which apertures 95 and 96 the portion 50' of the leaf spring may extend and is free to move. Over each aperture 95 and 96 may be provided flexible dirt sealing cover of plastic or rubber boots 97 and 98, respectively, each of which may be fastened such as by bolts 99 to the edges of their respective apertures.

All of the housings 60, 70, 80 and 90 should be sufficiently rigid, and preferably light in weight, to mount the leveling mechanism and support therethrough the load transmitted from the ends 50' of the spring 50 to the chassis 30 of the vehicle.

II-B. Actuators

*1. Oscillating drive oscillating carriage type.*—Referring to FIG. 4 there is disclosed one form of an embodiment of this invention in which the movable shackle assembly for the end section 50' of the leaf spring 50 is supported between a pair of upper and lower rollers 101 and 102 mounted on a depending oscillating carriage or arm 105, pivoted at 106 to the sides of its housing 60. The rollers 101 and 102 engage opposite faces of the two outer ends of the leaves of section 50' of the spring, the lower roller 102 of which may be urged into position to clamp the leaves 50' against the upper roller 101, by an adjustable and/or resilient means 107, such as a screw applied spring or block of rubber, mounted at the lower end of the oscillating arm 105. This oscillating arm 105 may comprise a pair of spaced side members, one extending across each side edge of the section 50', between which side members the rollers 101 and 102 are journalled. These two side members of the oscillating shackle carriage arm 105 may be anchored together by one or more bridging members 108, in order to increase the strength of said arm. Also between said side members may be journalled a trunnion nut 110, threaded on a screw 111, driven by a reversible electric motor 115 through gear reduction means 116. The screw 111, reversible motor 115 and gear means 116 may be supported by a common box 117, which box 117 may be pivoted on a pin or stub shaft 118 mounted in a side of the housing 60. Thus, as the reversible motor 115 is operated to drive the gear means 116 to rotate the screw 111, the trunnion nut 110 journalled in the movable shackle arm assembly 105, is correspondingly oscillated forward and backward from the full line to its dashed line position 105a shown in FIG. 4, to both shorten and lengthen, respectively, the effective length of the spring 50, as well as simultaneously increase the stress thereon, by moving the spring downwardly as shown in the dotted line position 50'a in FIG. 4. The box 117 is pivoted at 118 to permit free movement of the nut 110 through the arc it must travel as it is pivoted on the oscillating arm 105 a fixed distance from the pivot 106 of said arm 105.

The reduction gear means 116 may be of any conventional type including a worm and worm wheel as described later in the embodiments of FIGS. 5, 10, 11 and 14; and the screw 111 may be replaced by a ball-bearing Saginaw type of screw and nut, without departing from the scope of this invention.

II–B–2. Oscillating Drive Reciprocating Carriage Type

Instead of the oscillating shackle carriage 105 as shown in the embodiment of FIG. 4, the carriage may be guided between a pair of parallel tracks or along a slot in the side of the casing, as shown in the embodiments of FIGS. 2, 3, 5, 6 and 11 through 16, in which there are shown mounted on or in the sides of the housings 60, 70, 80 or 90 above described, a pair of guide tracks 121 and 122 for the movable shackle or carriage, which tracks may be mounted at an angle of about 30° to the horizontal as shown herein. These guide tracks 121 and 122 may be mounted with separate parallel rails on the inside of their housings, or may be cast integrally into the sides thereof.

II–B–2–a. Separate Motor Drive

Figure 7:
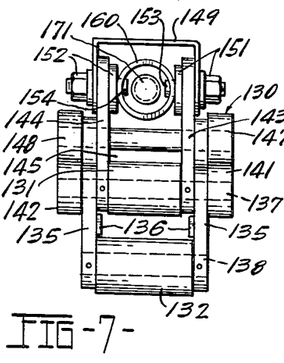
FIG. 7 is an end view of the movable spring engaging carriage portion shown in the embodiment of FIGS. 5 and 6.

Referring now more specifically to the embodiment of FIGS. 1, 2, 3, 5 and 6, there is shown a movable shackle or carriage 130, with upper and lower leaf spring engaging rollers 131 and 132 corresponding to the rollers 101 and 102 described in FIG. 4, but the lower roller 132 thereof need not be resiliently mounted, in that the distance between the two rollers remains the same at all times, because they roll parallelly along the upper and lower surfaces of the two spring leaf end sections 50' as shown in FIG. 5. These rollers 131 and 132 may be supported by a pair of parallel shackles 135, as shown in more detail in FIGS. 7, 8 and 9, which shackles 135 also may have mounted on their inner surfaces between the rollers, a friction engaging pad 136 of fibrous or other material to engage the side edges of the spring section 50' and to prevent noise and rattling. The rollers 131 and 132 may be mounted on shafts 137 and 138, the ends of which are journalled in the ends of the shackles 135, and the upper shaft 137 of which may be longer and extend beyond the outer ends of the shackles 135 as shown in FIGS. 6 and 7, to provide bearings for a pair of slide, guide or track engaging rollers 141 and 142, which engage the tracks 121 and 122, respectively, for positively guiding the movement of the movable shackle assembly or carriage 130.

This movable shackle assembly 130 herein also may comprise a pair of triangular plates 143 and 144, to one of the corners of each of which the shaft 137 also may be journalled. One of the other two corners of each triangular plate 143 and 144 may journal a shaft 145 parallel with shaft 137, on the outer ends of which shaft 145 may be mounted an additional pair of slide or track guiding rollers 147 and 148, corresponding with rollers 141 and 142, respectively, to thereby support the third corner of the triangular plates 143 and 144 away from the track for connection with the driving mechanism. Bridging said third or upper corner of the plates 143 and 144 may be provided a U-shaped spacer member 149, which spacer may be attached thereto by a pair of trunnion headed bolts and nuts 151 and 152 (see FIGS. 6 and 7). The trunnion portions 153 and 154 of said bolts 151 and 152 are axially aligned and arranged facing each other between said plates 143 and 144, for engagement into cooperating apertures of a jack tube 160, near the opposite end of which tube is anchored a nut 161, which may be fastened to the tube 160 such as by crimping 162 (see FIG. 5).

The driving nut 162 may be threaded on a screw 171 driven by a motor 175 through a gear reduction means 176 in a box 177, which box 177 supports also said motor 175 and said screw 171 and is pivoted on a pin 178 which may be mounted in the side of the housing 60. Thus as the reversible motor 175 drives the screw 171 to move the nut 162 and its jack tube 160 to and from the box 177, the movable shackle carriage 130 is correspondingly positively driven or reciprocated along the tracks 121 and 122 from the full to the dashed line positions 130 and 130a shown in FIG. 5, to both lengthen and shorten the leaf spring 50 as well as to decrease and increase the stress therein by moving it upwardly and downwardly into its full and dashed line positions 50' and 50'a also shown in FIG. 5. Since the movement of the movable shackle 130 is not shown to be parallel to the screw 171, pivoting of the whole device attached to the box 177 for driving said screw, is required to permit free operation, so that correspondingly the motor 175 is moved into its dashed line position 175a shown in FIG. 5, when the movable shackle 130 and end of the leaf spring 50' are in their positions 130a and 50'a, respectively.

The reduction gearing 176 between the motor shaft 181 of motor 175 (see FIG. 10) and the screw 171 may comprise a worm 182 keyed to the shaft 181 which drives a worm gear 183 anchored to the end 184 of the screw 171, which end 184 may be mounted in a ball bearing 185 (see FIG. 5) provided therefor in the box 177.

Since the tracks 121 and 122 are not parallel with the edges of the housing 60 nor with the road or the horizontal, and in order to conserve as much space as possible, and keep the device hidden under the normal body of the vehicle, the box 177 and motor 175 assembly is pivoted on the pin 178. Furthermore, the pivoted mounting for the drive assembly box 177 is so located with respect to the reciprocating movement of the movable shackle 130 in the tracks 121 and 122, so that as more stress is to be applied to the spring leaves 50', namely toward the dashed line position 130a of the movable shackle, more direct force from the screw 171 is applied to the movable shackle connection through the jack tube 160, thus increasing the mechanical advantage of the system when required.

If desired the limits of travel of the movable shackle or carriage 130 may be controlled by sensing switches 191 and 192, mounted in the housing 60 at opposite ends of the tracks 121 and 122. These sensing switches may be provided with carriage engaging fingers 193 and 194, respectively, the finger 194 herein shown in FIG. 5 to be operated through a carriage engaging pin 195 slidable through an aperture in a track cross-member 196 at the upper end of the tracks 121 and 122.

II–B–2–b. Single Motor Drive

Instead of separate motors for driving each of the leveling devices or mechanisms on each of the pair of rear springs 50 of a vehicle, one motor may be provided therefor as shown in FIGS. 11 and 12, in view of the fact that vehicles are generally substantially evenly loaded from one side to the other, and therefore the simultaneous stressing and changing of the lengths of the two leaf springs at the rear of the vehicle would under most circumstances adequately levelize and maintain a constant frequency of vibration for the vehicle. Accordingly there is shown in FIGS. 11 and 12 a single motor 205 which may be mounted on the rear cross-frame member 39 and have flexible shafts 206 and 207 connected to the opposite ends of the motor shaft and extending directly to the gear reduction boxes 208 in each of the housings 70, which gear reductions may contain a worm and worm gear similar to that shown in FIG. 10 for operating the two jack tubes 160 as described above. Thus only the gear reduction box 208 and screws journalled therein need to be pivotally mounted on the pivot pins 178 described for the boxes 177 in FIG. 5. Other parts of the mechanism shown in FIGS. 11 and 12, carry the same reference characters as the same parts previously described having the same function.

II–B–2–c. Hydraulic Motor Drive

Referring now to FIG. 13, instead of employing one or more electric motors for driving the movable shackles along the slanted tracks 121 and 122 as previously described, a hydraulic motor 215 may be provided therefor in each leveling device which may comprise a cylinder 216 having a reciprocating piston and piston rod 217 extending therefrom, the outer end of which may be directly connected to a movable shackle carriage 220 by a pivoted connector member 221 which may be in this case anchored directly to the shaft 145 for the upper or second pair of guide rollers 147 and 148 in the tracks 121 and 122. In this case, the movable shackle assembly may comprise only a pair of links 223 and 224, instead of the triangular plates 143 and 144, for connecting the two shafts 145 and 137 of the guide rollers 141, 142 and 147, 148. The shaft 137 also may mount the upper roller 131 and have connected thereto by shackles 135, the lower roller 132, which rollers 131 and 132 ride along the leaf section 50′ of the spring 50. Thus by the extension of the piston rod 217 from the full line position shown in FIG. 13 to its dashed line position 217a, the movable shackle 220 is moved into its position 220a and the leaf spring is shortened and moved downwardly into position 50′a.

The reciprocating hydraulic motor 215 disclosed in FIG. 13 may be powered by fluid pressure from a pump 225 which may be driven by an electric motor 230, which pump may be supplied with the hydraulic fluid, such as oil, from a reservoir 232 through duct 233, and from the pump 225 through ducts 234 to reversing valves 235, one for each of the leveling devices employed on the vehicle. From each reversing valve 235, there are provided three separate ducts. Two of these ducts 236 and 237 preferably connect flexible ducts 238 and 239 adjacent the pivoted hydraulic motor cylinder 215 in the housing 80, to the opposite ends of the cylinder 215, for the hydraulic fluid to pass out through one and return through the other, depending upon which way the piston 217 is to be moved in response to the operation of the reversing valve 235. The other or third duct 241 from the reversing valve 235 is for the return of the fluid to the reservoir 232, which duct is connected to the duct 236 or 237, whichever one is not supplying fluid under pressure to the cylinder 216. The reservoir 232 may be provided with a capped inlet 242 through which hydraulic fluid may be added to the system when required. According to this hydraulic system, it is possible that all of the hydraulic parts thereof except the ducts 236, 237 and 241 may be located in one place on the vehicle, such as adjacent engine for driving the vehicle under its hood, thus reducing materially the amount of mechanism adjacent each of the levelizing devices. However, if fewer ducts are desired, one pressure duct 234 may be connected to the separate reversing valves 235 adjacent each levelizer device, which reversing valves may be located inside their housings 80. Each reversing valve 235 may be controlled electrically by means of solenoids 243 and 244, similarly to the reversing relays employed in an electric motor controlled system as previously described and for which the control circuits will be described later in section II–D. When these solenoids 243 and 244 are de-energized, the valve 235 preferably is returned automatically, such as by a spring, to a neutral position so that it cuts off or closes all the ducts 234, 236, 237 and 241 to and from the cylinder 215 and thereby the position of the hydraulic cylinder 215 is maintained until the valve 235 is operated to change it.

*II–B–3. Fixed Drive Reciprocating Carriage Type*

Instead of the oscillating driving motors and their drive mechanism previously described to be pivoted in the housings 60, 70 and 80, the driving mechanism may be fixedly mounted within such housing, as shown in FIGS. 14, 15 and 16, and connected to a movable shackle or carriage directly or by means of a link or links.

Figures 8, 9:
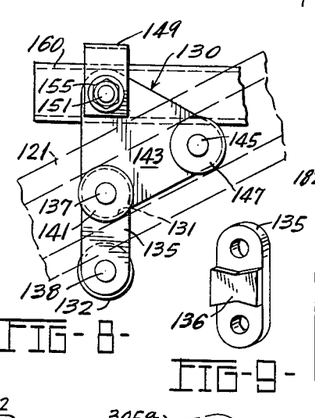
FIG. 8 is a side view of the spring engaging carriage shown in FIG. 7 with its track shown in dashed lines.
FIG. 9 is a perspective view of one of the shackle links employed in the carriage for journalling one end of each of the two leaf spring engaging rollers shown in FIGS. 5, 6, 7 and 8.
Figure 10:
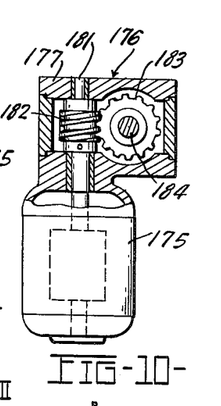
FIG. 10 is a partial sectional view taken along line X—X of FIG. 5, showing the electric motor and part of the gear reduction mechanism for driving the levelizer mechanism thereof.

In the embodiment of the leveling device of this invention and its drive mechanism shown in FIGS. 14 and 15, a movable carriage 250 is shown provided with larger diameter upper rollers 253, 254 and 255 mounted on a shaft 257 with the parallel link portions 258 and 259 journalled between said rollers and with said portions being connected together by an integral bridging portion 261 for strengthening the link 251. These larger rollers may be employed because the upper rollers 253, 254 and 255 support most of the load and all of the stress through the carriage links 250 to the end portion 50′ of the spring 50. Outside of the rollers 253 and 255 on shaft 257 there may be provided a pair of shackles 262 and 263 for journalling the lower roller 264 on a second shaft 265, which lower roller engages the lower surface of the spring section 50′ and maintains the upper surface of the spring section 50′ always in contact with the upper rollers 253, 254 and 255. These shackles 262 and 263 also may contain noise deadening fibrous or other pads 266, similar to pads 136 shown on shackles 135 in FIG. 9. Also if desired, the two shackles 262 and 263 may be integrally connected together by a bridging member 267 as shown in FIG. 14, for further increasing their rigidity, which bridging member is similar to bridging member 261 described above for the link 251. These shackles 262 and 263 further may have their upper ends journalled on bushings 268 around the ends of the shaft 257, which bushings also may be sufficiently long to support the pivoted slide blocks 271 and 272 movable in the tracks 121 and 122 formed in the opposite sides 91 and 92 of the housing 90. These slide blocks may be replaced by one or more pairs of rollers 141 through 144 as shown in FIGS. 7 and 8 or vice versa, without departing from the scope of this invention.

The upper or other end of the link 251 may have its parallel side portions 258 and 259 fastened in trunnions 273 and 274 on a threaded nut 275, the outer ends of which trunnions may extend beyond said side portions to journal rollers 277 and 278, which may guide the trunnion nut 275 along a pair of tracks 281 and 282 parallel to a driving screw 285 for moving said nut 275 as well as to aid in removing transverse stresses applied by the link 251 to said driving screw 285. This driving screw 285 may be journalled in bearings 286 and 287 at its opposite end, which bearings may be formed in or be attached to the housing 90. At one end of the drive screw 285 there may be provided a worm gear 288 keyed to the end 289 of the screw 285, which worm gear may be driven by a worm 289′, which worm may be connected directly through a flexible shaft, as shafts 206 and 207 shown in FIGS. 11 and 12, to a rotary motor. Thus, each mechanism disclosed in FIGS. 14 and 15 may be adapted to have a separate drive motor, or a single motor may drive two or more simultaneously operable leveling devices. An important advantage of the location of the screw 285 with respect to the angular guide track 121 and 122 for the movable shackle 250, is that as the shackle 250 approaches its full line position shown in FIGS. 14 and 15, the mechanical advantage of the stress applied thereto by the screw 285 is materially increased, because of the change in the angle of the link 251, from that when in their dashed line positions 250a and 251a shown in FIG. 14, corresponding to the position 50′a for the section of the spring 50. Thus rotation of the screw 285 moves the trunnion nut 275 from one end of the screw to the other to correspondingly slide the movable shackle or carriage 250 from one end of the track 121 and 122 to the other, and to any position therebetween as determined by the control through the electrical circuits hereinafter described in sections II–C and D.

A further modification of the embodiment shown in FIGS. 14 and 15 is shown schematically in FIG. 16 in which such a fixed drive leveling device is adapted for a housing 60 as shown in the previous embodiment of FIGS. 5 and 6, for a movable shackle or carriage 290, with a similar driving mechanism of a reversible electric motor 175, connected to a gear box 176 having the screw 171 extending therefrom, all of which are mounted rigidly inside of the housing 60 with the screw 171 mounted parallel with a pair of movable shackle guide tracks 121 and 122 on opposite sides of the housing 60. Thus tracks 121 and 122 are shown to be substantially parallel to the spring 50. Thus no pivoted link is required between the driving mechanism for the movable shackle or carriage 290, connected to the nut 295 threaded on the screw 171. In this embodiment the movable shackle moves at a much less angle to that of the normally longitudinal axis of the leaf spring 50 and may apply less leveling and less stress to the spring 50 than in the previously described devices, but the frequency rate of the vehicle is nevertheless varied by this embodiment of this invention even if only the effective length of the spring 50 is varied.

II–C. Automatic Sensing Switch

Referring again to FIGS. 1, 2 and 3 and now in combination with FIGS. 17 through 20, there is disclosed one embodiment of a position sensing switch and its control arms for automatically gauging the approximate height of the vehicle above the road, or correspondingly the distance between the chassis 30 and the axle housing 40 of the vehicle. In these figures there is disclosed a sensing switch box 300 (or 300R for the right side of the vehicle) which may be mounted on one of the frame members 31 as shown in FIGS. 2 and 3, or on both frame members 31 and 32 as suggested in FIG. 1, and in which box 300 may be provided a pair of raising and lowering sensing switches 301 and 302, respectively, which indicate when the leveling devices on the vehicle must be operated to correspondingly raise and lower the vehicle by increasing and decreasing, respectively, the stress in the leaf spring or springs 50 of the vehicle suspension.

Figure 17:
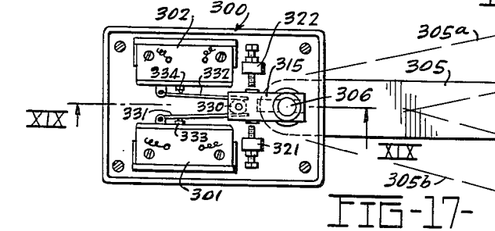
FIG. 17 is an enlarged side view of one embodiment of a level or position sensing switch and its control arms, which may be mounted between the axle and the vehicle chassis as shown in FIGS. 1, 2 and 3, with alternate positions of one control arm therefor being shown in dashed line.
Figure 18:
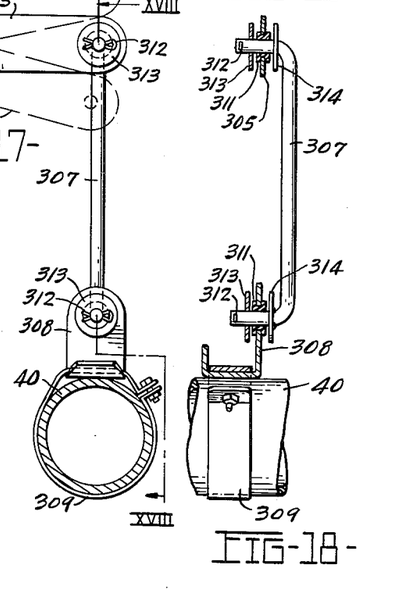
FIG. 18 is a sectional view taken along the line XVIII—XVIII of FIG. 17 showing the connection between the axle and one control arm for operating the sensing switch.
Figure 19:
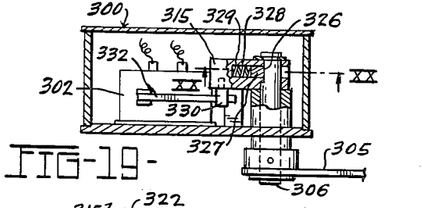
FIG. 19 is a horizontal section taken along line XIX—XIX of FIG. 17 of the sensing switch showing another operating arm therefor.
Figure 20:
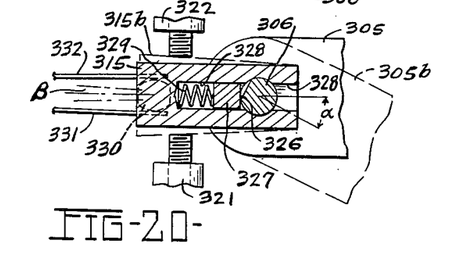
FIG. 20 is a further enlarged sectional view taken along line XX—XX of FIG. 19 showing the detent or cam mechanism between the two switch operating arms for the sensing switch, with dashed lines showing the angles of movement of said arms.

Two pairs of levers or arms are employed for alternately controlling these switches 301 and 302, one of which levers 305 may be fastened or keyed to a shaft 306 extending from one side of the box 300, as shown in FIG. 19. This lever 305 may have its outer end connected by means of a link or rod 307 extending vertically downward to a bracket 308 which may be clamped to the top of the axle housing 40 by means of a clamp 309 (see FIGS. 17 and 18). The ends of the link or rod 307 may be bent at right angles thereto as shown in FIG. 18 and journalled in noiseless bearings or grommets 311, such as of rubber, plastic or fibrous material, and then held in position by cotter pins 312 on the outside of a pair of washers 313 and 314 on each side of the grommets 311. Thus as the vehicle is loaded or unloaded the lever arm 305 will take dotted line position 305a or 305b as shown in FIG. 17 until the leveling mechanism is operated to bring the lever arm 305 back into its full line position as shown in FIGS. 2, 3 and 17.

The motion of the lever arm 305 rotates the shaft 306 to which it is keyed to correspondingly transmit a similar motion to the second lever arm 315 mounted on the same shaft 306 inside of the switch box 300. This second lever 315, however, is limited in its movement to an amount just sufficient to operate the contacts of the sensing switch 301 or 302, and accordingly does not follow the entire movement of the lever 305. This difference in movement is illustrated by the difference between the angles α and β in FIG. 20, which may correspond to the maximum angles through which the levers 305 and 315 may move, assuming that the motion of the lever 305 is at least equal to that of the angle β. The maximum angular rotation or oscillation of the lever 315 preferably is further limited by a pair of adjustable stops 321 and 322 mounted in the box 300 so as to prevent damage to the sensing switches 301 and 302. This difference in motion may be compensated for by a detent or cam device comprising a flattened portion 326 on the shaft 306 against which a plunger 327 may be spring applied, which plunger 327 may be mounted in a channel or hole 328 drilled in the end of lever 315, transverse to the hole provided therein for the shaft 306. Behind the plunger 327 may be provided a helical spring or other resilient member 329 to normally urge the plunger 327 toward the flat portion 326 on the shaft 306. However, as the shaft 306 rotates beyond the angle β, the plunger 327 is moved or cammed radially outward against the action of the spring 327, and further rotation of the lever 315 is not thereby transmitted to the lever 315.

At the outer end of the lever 315 there may be provided an extension or switch operating pin 330, the opposite sides of which engage microswitch operating levers or arms 331 and 332 so that as the pin is moved either upwardly or downwardly it correspondingly moves the arm 332 or 331, respectively, to operate a contact pin 334 or 333, to close sensing switch 302 or 301. Thus when the lever 305 is moved into position 305b it carries with it the lever 315 to move it into its position 315b shown in FIG. 20 against its corresponding preset stop 322, to press against the lever 332 to operate contact pin 334 to close the sensing switch 302, and thus cause a circuit to be energized to start a motor to lengthen and reduce the stress on the spring suspension 50 by means of a leveling device, and lower the vehicle to its normal ride position or constant height above the road to the full line position of the levers 305 and 315. Accordingly, the distances D1 and D2 shown in FIGS. 2 and 3 for a loaded and unloaded vehicle, are substantially equal (except for tire compression differences), when the leveling devices have been operated to place the sensing switches in their neutral or full line positions shown.

The electric conductors to and from the switch boxes such as box 300R on the right side of the vehicle in FIG. 1, may be enclosed in conduits 341R and 342R as shown in FIGS. 1, 2 and 3, and these conductors may be connected in accordance with any one of the wiring diagrams described in the following sections. If desired, a single sensing switch may be provided for both rear suspension springs of the vehicle, or separate sensing switches may be provided adjacent each wheel suspension.

II–D. Electrical Control Circuits

Figure 21:
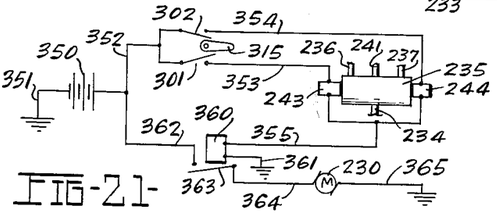
FIG. 21 is a schematic wiring diagram of an electric control circuit for the hydraulic driven leveling device shown in FIG. 13.

1. *Hydraulic electric system.*—Referring now to the wiring diagram shown in FIG. 21 for controlling the hydraulic system of FIG. 13, there is shown again from FIG. 13, a reversing valve 235 with its ducts 234 and 236, 237, 241 connected thereto, the two solenoids 243 and 244 for operating that valve, the motor 230 for the pump 225, and from FIG. 17 the sensing switches 301 and 302 operated by the lever arm 315. The energy for this circuit may be provided from the storage battery 350, such as normally employed in all self-propelled vehicles, one terminal of which battery may be connected through a conductor 351 to ground. The other terminal thereof is shown herein connected to one conductor 352 to each of the sensing switches 301 and 302 in parallel, and thence through separate parallel conductors 353 and 354 to the separate raising and lowering solenoids 243 and 244 of the reversing valve 235, and then both solenoids 243 and 244 may be connected in series through conductor 355 to the motor starting relay 360 before completing the circuit to ground through conductor 361. The other circuit shown in this diagram for the energization of the motor 230 from battery 350 is through another conductor 362, switch 363 operated by starting relay 360, conductor 364, motor 230 and conductor 365 to ground. Thus when one of the two leveling switches 301 or 302 is closed, current flows through the corresponding solenoid 243 or 244 to operate the reversing valve 235 and simultaneously energizes in series therewith the starting relay 360 for the motor 230, so that the motor will start to pump the fluid from the reservoir 232 shown in FIG. 13 through the reversing valve 235 and the proper ducts connected thereto, to operate the hydraulic motor cylinder 215 to move the movable carriage 220 and thereby flex the spring 50 until the level of the vehicle has been raised or lowered sufficiently to cause the lever 315 to open the closed switch 301 or 302 and de-energize the circuit.

Since the solenoid 243 or 244 is energized in series with the motor starting relay 360, it is desirable that a 12 volt system be used in this case, so that standard 6 volt solenoids and relays 243, 244 and 360 may be employed in this circuit. However, if only a 6 volt source is provided, three volt solenoids and relays are desired, so that they both will operate in series as shown in this circuit. Nevertheless, other electrical circuits may be employed for controlling this hydraulic system.

This circuit for controlling the reversing valve 235 may also be passed through additional control switches, such as the ignition and other switches on the vehicle, but such additional switches will be described in connection with the following electrical diagrams for the electrical control apparatus.

II–D–2. Single Motor Electric System

In order to control the levelizers of this invention for a vehicle so that they will respond only to changes in static load, it is necessary that means be provided to insure that the levelizers are actuated only while the vehicle is stationary. Some circuits which provide the necessary components to accomplish this result are shown in the following wiring diagrams.

Figure 22:
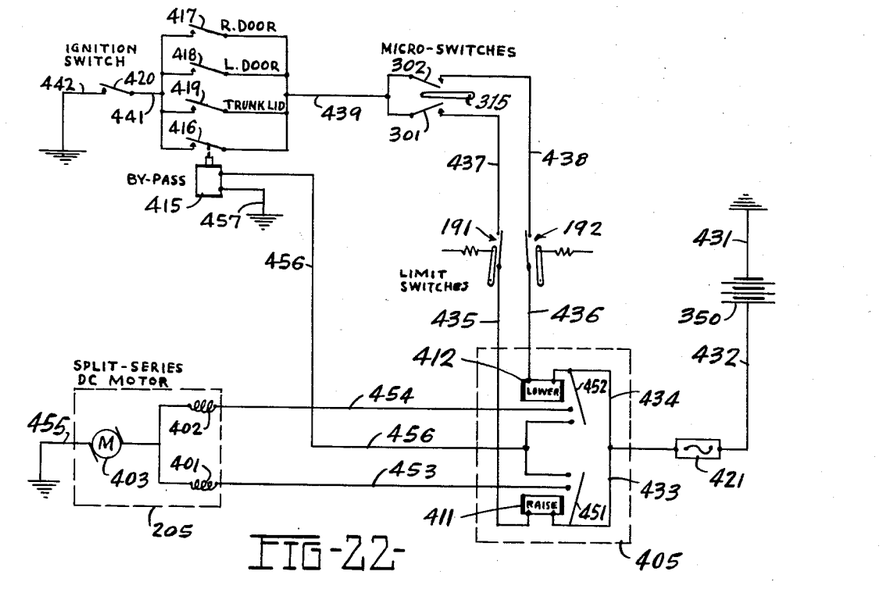
FIG. 22 is a schematic wiring diagram of one embodiment of an electrical control circuit for the single electric motor driven leveling device as shown in FIGS. 11 and 12.

Referring now to the circuit of FIG. 22, there is shown in the dotted rectangle the circuit for a reversible motor 205 corresponding to the single motor shown in the system described in FIGS. 11 and 12, which motor 205 may have raising and lowering field coils 401 and 402 in parallel with each other and energized, respectively, by the raising and lowering sensing switches 301, 302 shown in FIG. 17; and an armature 403 in series with each said field coil. The limit switches 191 and 192 shown in FIG. 5, are also shown herein located in the circuits of sensing switches 301 and 302, respectively, for limiting the travel of the movable shackles or carriages, by breaking the circuit to their driving motors 205 when the movable shackle or shackles reach their limits of travel, in their tracks 121 and 122 so as not to overload said motors.

Besides the electric energy source or battery 350, there is shown a dotted rectangle of a box 405 for a raising and lowering motor control relay 411 and 412 controlled respectively by the sensing switches 301 and 302 and limit switches 191 and 192, which motor control relays 411 and 412 energize the corresponding field windings 401 and 402 of the motor 205 for raising and lowering the chassis of the vehicle with respect to ground or its axle housing 40. In addition to the motor control relays 411 and 412 there is shown by-pass or holding relay 415 which controls a holding switch 416 in the circuit to the sensing switches 301 and 302 to insure that said circuit will not be opened until opened by said sensing switches to insure completion of the leveling of the vehicle once it is initiated. These holding contacts 416 are shown in parallel with normally open switches 417, 418 and 419 which correspondingly may be closed when the right hand door, the left hand door, or the trunk lid of the vehicle are opened, which generally only occurs when the vehicle is not in motion, that is, when it is parked or in a static condition. Furthermore there is shown in the circuit of FIG. 22 a switch 420, which may be coupled with or include the ignition switch of the vehicle, so that the circuit is only in operation when the ignition switch and all electricity in the vehicle is turned on; and also a safety fuse 421 may be included in the circuit adjacent the battery 350.

In the operation of this circuit in FIG. 22, when (a) the ignition switch 420 is closed, (b) one of the right or left doors or trunk lid is opened, (c) movable shackle or carriage 130 is not in one of its limiting positions so that its corresponding limit switch 191 or 192 therefor is closed, and (d) the vehicle is loaded or unloaded so that it does not have its chassis a predetermined height from the road so that one of the sensing switches 301 or 302 is closed by the movement of the control arms 305 and 315, then a circuit is completed from ground through conductor 431, battery 350, conductor 432, fuse 421, conductor 433 or 434 through corresponding raising or lowering motor control relay 411 or 412, conductor 435 or 436, limit switch 191 or 192, conductor 437 or 438, through the correspondingly closed sensing switch 301 or 302, conductor 439, through the closed one or more of the door or trunk lid switches 417, 418 and/or 419, conductor 441, ignition switch 420, and conductor 442 back to ground. This energizes the corresponding raising or lowering relay 411 or 412 which closes its corresponding contacts 451 or 452 to complete a circuit from ground through conductor 431, battery 350, conductor 432, fuse 421, conductor 433 or 434, contacts 451 or 452, conductor 453 or 454 to energize the raising or lowering field winding 401 or 402 and the armature 403 of the motor 205, and conductor 455 back to ground. The motor 205 now remains energized until the corresponding sensing switch 301 or 302 is opened, or the corresponding limit switch 191 or 192 is opened.

In the event that the door, doors and/or trunk lid which has been opened is closed before the motor 205 completes the levelizing operation, to open correspondingly the sensing switch 301 or 302, there is provided the holding relay 415 with its contacts 416 which bypass door and trunk lid switches 417, 418 and 419, and which relay 415 is energized through the closing of contacts 451 or 452 of the raising or lowering motor relay 411 or 412 and conductors 456 and 457, from the battery 350 to the ground. This by-pass relay 415 is so connected through the contacts 451 and 452 of the reversing motor control relay 411 or 412, that when these relays are de-energized and the motor 205 is stopped, the by-pass relay 415 correspondingly will be de-energized and its contacts 416 will open.

Figure 23:
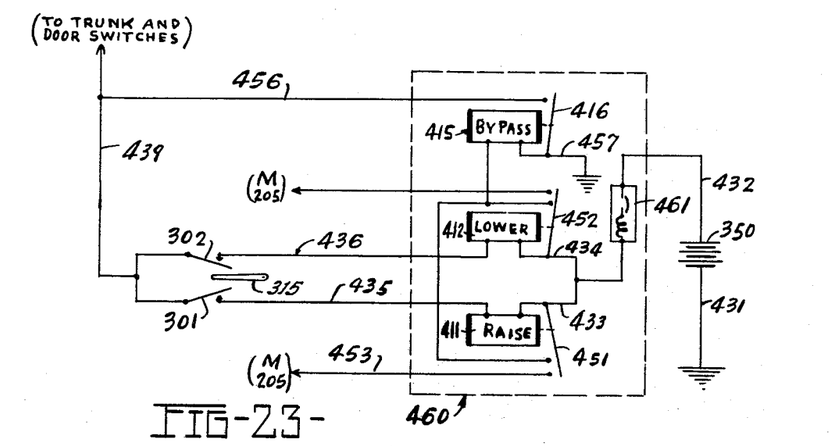
FIG. 23 is a schematic wiring diagram of a modified portion of the circuit of FIG. 22, in which the by-pass relay, motor control relays, and automatic re-set circuit breaker, are arranged as a unit in a single control cabinet.

If desired the motor control relays 411 and 412 and the by-pass relay 415 may be mounted in a common box 460 as shown in dotted lines in FIG. 23.

Instead of having limit switches 191 and 192 between conductors 435–437 and 436–438 there also may be employed a self-restoring circuit breaker or overload switch 461 (see FIG. 23) in place of the fuse 421, which overload switch 461 also may be placed in the box 460. Accordingly, conductors 435 and 436 from the motor control relays 411 and 412 are connected directly to sensing switches 301 and 302, respectively. Thus when the movable shackle or carriage driven by the motor 205 reaches the limit of its travel along its tracks 121 and 122 or 491 and 492, it will be overloaded and cause the circuit breaker 461 to operate breaking the circuit and stopping the driving motor, after which break the circuit breaker 461 will reset itself for the next operation of the driving motor.

II–D–3. Plural Motor Electric System

Figure 24:
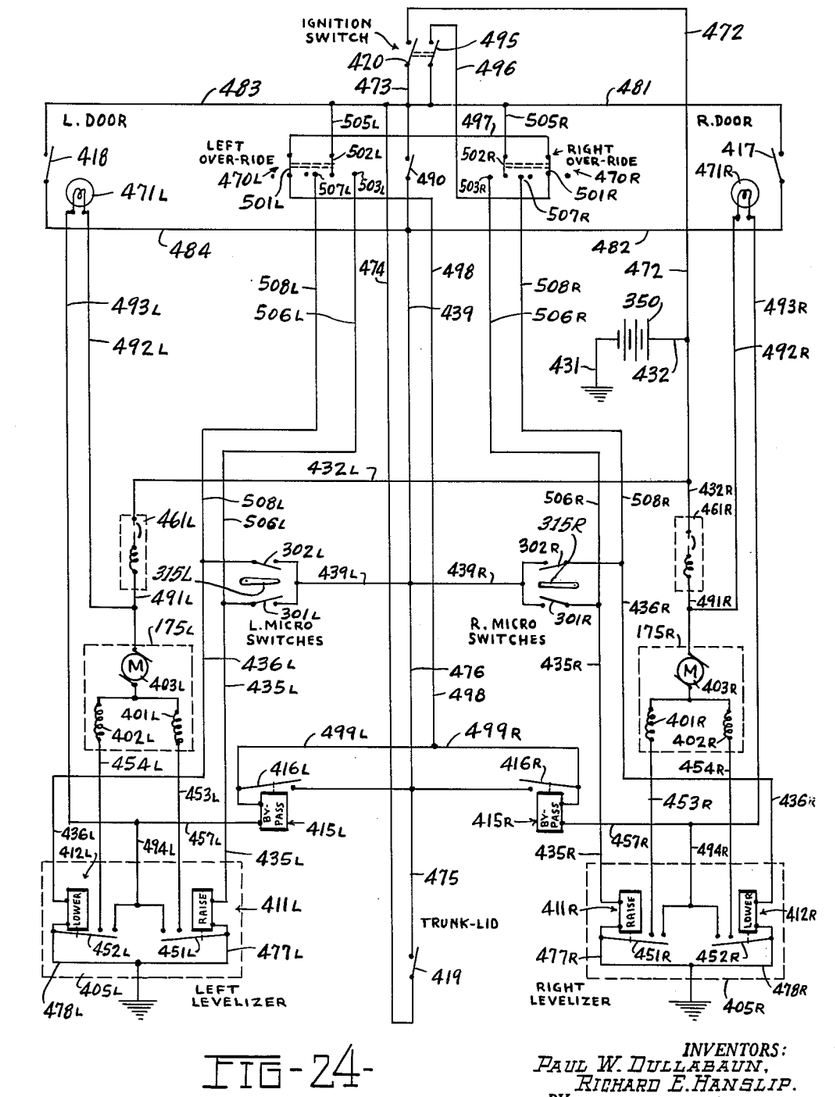
FIG. 24 is a schematic wiring diagram of one embodiment of an electrical control circuit for a two motor leveling system, such as disclosed in FIG. 1, showing separate manual by-pass switches, operation indicating lights, and separate control switches for each side door of the vehicle as well as for the trunk lid.

Referring now to the circuit shown in FIG. 24 there is disclosed all of the elements mentioned in the previous two circuits having the same or similar reference characters, except that FIG. 24 is directed to a dual or separate motor control system, that is, one motor 175R and one motor 175L for the levelizer on the right and left rear sides of the vehicle as disclosed in the embodiment of FIGS. 1, 2 and 3, and correspondingly the control circuits for the right and left side of the vehicle have been given the same numeral reference characters but followed by "R" and "L" which refer to the same parts but on the right and left side of the vehicle, respectively. In addition, the circuit shown in FIG. 24 has located the left and right door switches 418 and 417, respectively, and trunk lid switch 419 on either side and at the bottom of the diagram with the necessary conductors connecting them, instead of bunching the switches together as shown schematically in FIG. 22.

In addition to an ignition switch 420 on a dashboard of a vehicle, the circuit shown in FIG. 24 also shows right and left side manually controlled levelizer over-ride switches 470R and 470L, respectively, as well as indicator lights 471R and 471L to indicate when and which one or both of the levelizing devices are operating. The function of these over-ride switches 470R and 470L is to by-pass the sensing switches 301R—302R and 301L—302L, and cut out the by-pass or holding relays 415R and 415L, in the event the operator of the vehicle wishes to manually raise or lower the vehicle beyond that of its normal predetermined level and height above the road.

Describing now the operation of the circuits in FIG. 24, let it be assumed that (a) the right side of the vehicle has been overloaded and the sensing switch 301R is closed, that (b) the over-ride switches 470R and 470L are in their full line neutral positions shown in FIG. 24, (c) that the ignition switch 420 is closed, and that (d) the trunk lid is open, closing switch 419. Under these conditions current from the battery 350, one terminal of which is grounded through conductor 431, passes through conductors 432 and 472, now closed contacts 420 of the ignition switch, conductors 473 and 474, now closed trunk lid switch 419, conductors 475, 476, and 439R, now closed sensing switch 301R, conductor 435R, raising motor control relay 411R to energize it, and thence through conductor 477R to ground. In the event the lowering sensing switch 302R is closed instead of sensing switch 301R, the circuit from conductor 439R will then pass through conductor 436R to energize the lowering motor control relay 412R and thence through conductor 478R to ground. Correspondingly, if the left side levelizing mechanism were to be operated the correspondingly referred to and numbered circuits would be energized. In the event the right door of the vehicle were opened instead of the trunk lid so that switch 417 were closed, the circuit from the ignition switch 420 and conductor 473 would then pass through conductor 481, now closed right door switch 417, conductors 482, 439 and 439R or 439L to the corresponding sensing switch, or through both conductor 439R and 439L if both sides have their sensing switches closed. Similarly, if the left door were opened instead of the right door, the circuit would be traced from the ignition switch contacts 420 through conductors 473 and 483, now closed left door switch 418, conductors 484, 439 and thence through the circuits as previously described.

In addition, the circuits shown in FIG. 24 may have a further manually by-pass operating switch 490 in parallel with the switch 417, 418 and 419, which switch 490 connects conductor 473 directly with conductor 439 so that if none of the doors are opened, nor the trunk lid, and the vehicle is at rest, the operator by closing the switch 490 may cause the levelizing system to become operative. This switch 490, however, is an optional switch which may be placed in the circuit for manual control thereof, however, it should not be closed when the vehicle is in motion in order to prevent the device from hunting every time the vehicle goes over a bump and either one or both of the levers 315R and/or 315L may be caused to close one or the other or both of the sensing switches 301R, 301L, 302R and/or 302L.

Referring back to the above mentioned example in which the right side of the vehicle has been lowered and the sensing switch 301R is closed and the corresponding motor control relay 411R is now energized, its contacts 451R close the circuit from the battery 350 through conductors 432, 432R, circuit breaker 461R, conductor 491R, through the armature and raising field coil 401R of motor 175R, conductor 453R, contacts 451R, and conductor 477R to ground, to complete the circuit for the energization of the motor 175R. Similar operation of the left side motor 175L will be effected, if one or the other of the motor control relays 411L or 412L is energized, which will cause the motor 175L to be energized from the battery 350 through conductors 432, 432L, circuit breaker 461L, conductor 491L, armature 403L and field winding 401L or 402L of motor 175L, and its corresponding conductor 453L or 454L, contacts 451L and 452L and conductors 477L or 478L, respectively, to ground.

The indicator lamp 471R is energized when the motor 175R is energized by the parallel circuit thereto from the battery 350 through conductors 432, 432R, circuit breaker 461R, conductors 491R and 492R, lamp 471R, conductors 493R and 494R and thence through the correspondingly closed motor relay operating contact 451R or 452R, and its corresponding conductor 477R or 478R to ground. Similarly, the indicator light 471L is energized in parallel with the motor 175L from the battery 350 through conductors 432, 432L, circuit breaker 461L, conductors 491L and 492L, lamp 471L, conductors 493L and 494L, the correspondingly closed motor control relay contact 451L or 452L and its corresponding conductor 477L or 478L to ground. Thus the indicator lights 471R and 471L for each of the levelizing devices are energized only when their corresponding motors 175R and 175L are running.

The by-pass relays 415R or 415L are energized through their correspondingly closed motor control relay contacts 451R—452R or 451L—452L, respectively, via a circuit from the battery 350, through conductors 432, 472, closed ignition switch 420, conductor 473, a second now closed contact 495 operated with contact 420 of the ignition switch, conductor 496, both normally closed contacts of over-ride switches 470R and 470L connected by conductor 497, and thence conductors 498, 499R and/or 499L, corresponding by-pass relays 415R and/or 415L to energize them, conductors 457R and/or 457L, 494R and/or 494L, correspondingly motor relay contacts 451R—452R, and/or 451L—452L, and conductors 477R—478R and/or 477L—478L to ground. Thus the by-pass relays of this circuit of FIG. 24 are connected for energization through the over-ride switches as well as the ignition switch, so that when either one or both of the over-ride switches 470R and 470L are manually operated, both by-pass relays 415R and 415L are cut out of the circuit and become inoperative.

Assuming the previous condition that the right side of the vehicle is overloaded and the operator is desirous of over-riding the normal automatic leveling of the vehicle through the opening of sensing switch 301R, the right over-ride switch 470R may then be operated toward the left in FIG. 24, so that the contacts 501R thereof are opened and its contact 502R closes against contact 503R, thereby respectively cutting out the by-pass relay 415R and bridging the circuit around both the door and trunk lid switches 417, 418 and 419, as well as that of manual switch 490, to complete a circuit directly to the motor control raising relay 411R as follows: from battery 350, through conductors 432, 472, now normally closed ignition switch contacts 420, conductor 505R, contacts 502R and 503R, conductors 506R and 435R, through relay 411R to energize it, and then through conductors 477R to ground. Similarly, if the over-ride is to lower the vehicle below that of its normally leveling position, the over-ride switch 470R is operated in the opposite direction, that is to the right in FIG. 24, which also breaks the contacts 501R cutting out the by-pass relay 415R, but now the movable contact 502R is connected to the contact 507R so that the circuit for energizing the lowering motor control relay 412R is completed from the battery 350, through conductors 432, 472, normally closed contact 420 of the ignition switch, conductor 505R, contacts 502R and 507R, conductors 508R, 436R, motor control relay 412R to energize it, and conductor 478R to ground. Similarly, if the left side over-ride switch 470L is to be operated, corresponding circuits with the same numerical reference characters followed by "L" are energized.

Thus, the control of the separate levelizers on each side of the vehicle may be independently or simultaneously operated by separate sensing switches 301R, 302R, 301L and 302L according to the circuit in FIG. 24. Similarly additional levelizers for additional suspension springs, such as one for each wheel of a four or more wheeled vehicle, may be correspondingly controlled by expanding the circuits of FIGS. 22, 23 or 24, without departing from the scope of this invention.

III. MODIFICATIONS AND CONCLUSIONS

This levelizing system although it has been described in connection with passenger type vehicles, it also may be employed on all types of trucks and other vehicles, and particularly rear loaded vehicles, including coupes, station wagons and pick-up trucks.

The previous description of different embodiments of this invention have been made to illustrate some of its different forms, however, it is to be understood that different parts and their functions of each of the different embodiments may be interchanged to perform the same function in another embodiment without departing from the scope of this invention.

While there is described above the principles of this invention in connection with specific apparatus, it is to be clearly understood that this description is made only by way of example and not as a limitation to the scope of this invention.

What is claimed is:

1. A levelizing device for a vehicle having a leaf spring suspension between a wheel and a frame of the vehicle, the improvement comprising: movable means for engaging one end of said leaf spring, guide means for said movable means having a fixed downward and inward guide path relative to said frame and normally obliquely transverse of the line between the reaction points at the ends of said leaf spring so that movement of said movable means along said path varies the distribution of force on said leaf spring end and simultaneously changes the effective length of and the stress in said leaf spring, whereby decreasing the effective length of said spring increases the relative distance between said wheel and said frame and vice versa, reciprocating means for moving said movable means along said guide means, and means responsive to a change in load on said vehicle to actuate said means for moving said movable means.

2. A device according to claim 1 wherein said movable means includes roller means for engaging the opposite sides of said one end of said leaf spring.

3. A device according to claim 2 wherein said guide means is directed generally toward and away from the axle of said wheel of said vehicle.

4. A device according to claim 2 wherein said reciprocating means for moving said movable means comprises a nut and screw, and a motor means for driving said screw, said nut being pivotally attached to said movable means.

5. A device according to claim 1 wherein said guide means is directed at about a 30° angle to said line between the reaction points at the ends of said leaf spring.

6. A device according to claim 1 wherein said reciprocating means for moving said movable means comprises a reversible motor means.

7. A device according to claim 1 wherein said reciprocating means for moving said movable means is pivotally attached to said frame of said vehicle.

8. A device according to claim 1 wherein said means to actuate said reciprocating means for moving said movable means includes an electrical controlled circuit including a switch responsive to the relative movement between the axis of said wheel and said frame of said vehicle.

9. A device according to claim 8 wherein said vehicle has a door and said circuit includes an additional switch means operated by said door.

10. A device according to claim 8 wherein said circuit includes an indicator to indicate the operation of said means to actuate said means for moving said movable means.

11. A device according to claim 8 including means for limiting the movement of said movable means.

12. In a vehicle according to claim 11 wherein said means for limiting said movable means comprises a pair of limit switches in said control circuit operated by said movable means.

13. A levelizing device for a vehicle having a leaf spring suspension between a wheel on an axle and a frame of the vehicle, the improvement comprising: movable means for engaging one end of said leaf spring, guide means attached to said frame obliquely transverse of the line between the reaction points at the ends of said leaf spring for guiding said movable means, means to move said movable means to simultaneously change the effective length of and stress in said leaf spring, whereby decreasing the effective length of said spring increases the relative distance between said wheel and said frame and vice versa, an electrical circuit for controlling the operation of said means for moving said movable means, switch means mounted on said frame of said vehicle, a cam frictionally connected to said switch means for operating said switch means, and a lever connected to said axle for operating said cam, whereby said switch means is responsive to the relative movement between said axle of said wheel and said frame of said vehicle.

14. A levelizing device for a vehicle having a leaf spring suspension between the wheel and the frame of the vehicle, the improvement comprising: movable means for engagement along one end of said leaf spring, guide means attached to said frame for guiding said movable means obliquely transverse of the line between the reaction points at the ends of said leaf spring, means for moving said movable means to simultaneously change the effective length of and stress in said leaf spring by applying a force on said movable means in response to variations in load on said vehicle frame, whereby decreasing the effective length of said spring increases the relative distance between said wheel and said frame and vice versa, a link between said moving means and said movable means, an electrical circuit for controlling the operation of said means for moving said movable means, switch means in said electrical circuit responsive to relative movement between the axis of said wheel and said frame of said vehicle in response to the load on said vehicle to actuate said means for moving said movable means, and a holding relay in said electrical circuit to maintain the actuation of said means to move said movable means until said circuit is broken by said switch means responsive to said relative movement between the axis of said wheel and said frame of said vehicle.

15. A device according to claim 14 including override switch means in said electrical circuit for by-passing said holding relay and said switch means.

16. In a vehicle having a chassis, wheels mounted on an axle, and leaf spring suspension between said chassis and said axle, the improvement comprising: movable shackle means mounted at one end of said leaf spring and having guiding means projecting therefrom, a recessed elongated guide fixed to said chassis obliquely transverse of the line between the reaction points at the ends of said leaf spring for reception of said guiding means so that movement of said movable means along said guide varies the distribution of force on said leaf spring end and simultaneously changes the effective length of and stress in said leaf spring, whereby decreasing the effective length of said spring increases the relative distance between said wheel and said frame and vice versa, driving means connected to said chassis for moving said movable shackle means along said guide, and means for detecting change in the relative distance between said chassis and said axle for controlling said driving means.

References Cited in the file of this patent

UNITED STATES PATENTS

| | | | |
|---|---|---|---|
| 1,200,194 | Houdaille | Oct. 3, | 1916 |
| 1,281,233 | Geert | Oct. 8, | 1918 |
| 1,429,411 | Davidson | Sept. 19, | 1922 |
| 2,224,717 | Austin | Dec. 10, | 1940 |
| 2,849,242 | Allison | Aug. 26, | 1958 |
| 2,882,068 | Faiver | Apr. 14, | 1959 |
| 2,950,124 | Pribonic | Aug. 23, | 1960 |